Figure 1:
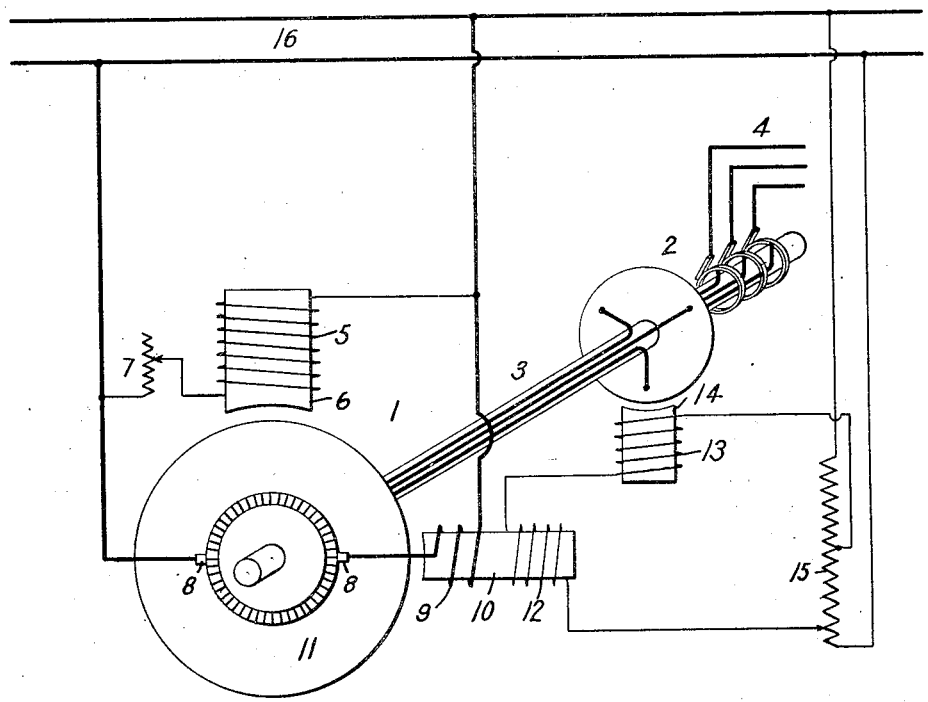
Figure 1:
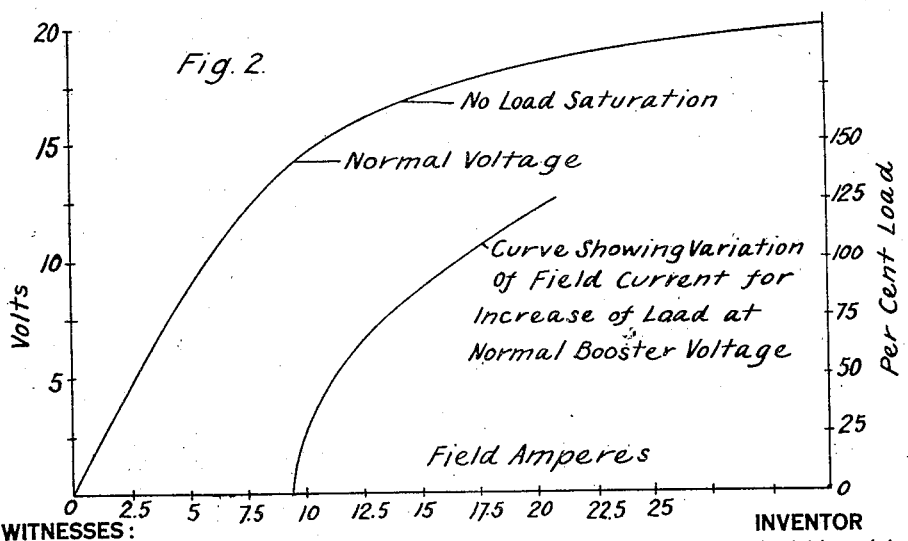

J. L. McK. YARDLEY.
DYNAMO ELECTRIC MACHINE.
APPLICATION FILED MAR. 28, 1913. RENEWED OCT. 8, 1919.

1,339,910.

Patented May 11, 1920.

WITNESSES:

INVENTOR
John L. McK. Yardley
BY
ATTORNEY

UNITED STATES PATENT OFFICE.

JOHN L. McK. YARDLEY, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,339,910.            Specification of Letters Patent.      Patented May 11, 1920.

Application filed March 28, 1913, Serial No. 757,359. Renewed October 8, 1919. Serial No. 329,415.

*To all whom it may concern:*

Be it known that I, JOHN L. McK. YARDLEY, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines and it has special reference to synchronous booster rotary converters and to means for improving the commutating conditions thereof.

The object of my invention is to provide a simple, effective and substantially exact compensating means for securing good commutating conditions in rotary converters under all conditions of load.

By "synchronous booster rotary converter" I mean a machine combining a rotary converter and a mechanically associated alternating current booster which have their rotor windings connected in series circuit relation. The preferable design disposes both converter and booster on a common shaft. The field frames are cast integrally and the series rotor connections are permanent, there being no slip rings on the converter proper.

The purpose of the combination is to "boost" or "buck" the incoming alternating current voltage for maintaining a predetermined direct current voltage on the converter.

The total armature reaction of a rotary converter, that is, the resultant reaction obtained by integration around the entire armature circumference of the reacting effects of both the alternating and direct currents of present during operation in the armature coils, is normally that of a motor, or, in other words, the alternating current reaction predominates. However, if we take simply the commutating zone, that is, the region directly beneath the commutator brushes, which region is, of course, all that we are concerned with when considering commutating conditions, it has been shown mathematically and proved by tests that the normal reaction in this zone is that of a generator, or, to state it differently, the direct current reaction is the greater.

The synchronous booster rotary converter has different electrical characteristics from the simple rotary converter, especially as regards armature reaction. In operating the combined machine, the excitation of the field coils of the booster may be reversed, thereby causing the generated voltage to raise or lower the voltage impressed at the collector rings. When the field is excited so that the voltage generated "bucks" the impressed voltage, the booster acts as a motor; when the field is excited so that the voltage generated "boosts" the impressed voltage, the booster acts as a generator.

In the former case, the rotary converter, being partially driven by the booster, delivers some of its direct current energy as a generator. The additional generative or direct current armature reaction present under the brushes by reason of this generator action of the rotary, is, therefore, additively combined with the generative reaction of the simple converter. On the other hand, in the latter case, where the booster is acting as a generator, being driven by the converter acting partially as a motor, the motor action of the simple converter is correspondingly augmented, and the additional motor or alternating current reaction in the commutating zone, being in opposition to the above-mentioned generative reaction of the simple converter in this zone, is, consequently, subtracted therefrom.

From the foregoing theoretical considerations it will be seen that the commutating field strength of the synchronous booster rotary converter must fulfil two requirements if it is to successfully maintain good commutating conditions: first, the field strength must vary with the load current of the converter proper; and second, the field strength must vary according to the additional armature reaction caused by the booster current, which reaction may be either positive or negative, as hereinbefore described.

Heretofore, the first recited requirement has been recognized and fulfilled by means of a series commutating field connected in the main line, thus having load current flowing through said field at all times. The second requirement, however, has either not been recognized or has baffled all attempts to properly compensate therefor.

According to my invention, I provide a method for successfully fulfilling both prescribed requirements. A series commutating field winding is provided for varying the commutating field strength in proportion to the load current; and an auxiliary or shunt commutating field winding, which is connected in series circuit relation with the main shunt field winding of the booster, for varying the commutating field strength in proportion to the total armature reaction of the converter, as will be understood from the following statement.

The additional armature reaction hereinbefore considered is proportional to the additional alternating or direct currents flowing in the rotary converter armature upon excitation of the booster, and, consequently, the reaction in question bears a readily determined relation to the field current of the booster.

In the accompanying drawings, Figure 1 is a diagrammatic view showing a rotary converter and associated booster embodying my invention, the field windings and their electrical connections only being shown, for the sake of clearness. Fig. 2 is a chart showing performance curves of a booster having electrical characteristics which particularly adapt it for the purposes intended.

The particular adaptability referred to embodies a design of the booster which gives poor regulation, that is, which requires a large increase of field current for a small increase in load, with a constant voltage. The booster is therefore designed with relatively high ampere-turns on its armature as compared with its field ampere-turns. The effect of a change in load current upon the commutating field is thereby magnified by reason of the large change of current in the commutating shunt field winding, and even a small change in armature reaction is thus properly compensated for.

Referring to the drawing, a rotary converter 1 is mechanically associated with an alternating current booster 2 by means of a shaft 3, and the rotor windings (not shown) of the two machines are connected in series circuit relation as hereinbefore stated. A plurality of conductors 4 serve to connect the booster 2 to a suitable alternating current supply circuit (not shown).

A main field winding 5 of the converter 1 is wound on a plurality of main polar projections, one of which is shown at 6, and a rheostat 7 is connected in series with said winding across the direct current terminals 8 of the converter armature. A commutating series winding 9 is disposed on a plurality of interpolar projections, one of which is shown at 10, and is connected in series with the direct current side of the armature 11 of the converter, thus having the full load current flowing therethrough at all times. A commutating shunt field winding 12 is likewise disposed on the interpolar projections 10. A shunt field winding 13 is wound on a plurality of polar projections of the booster 2, one of which is shown at 14, and is connected in series with the commutating shunt winding 12 through a reversing rheostat 15 which is connected across the direct current line 16.

The operation of the foregoing apparatus may be described as follows: Assuming that the load current undergoes an increase, entailing a drop in direct current voltage; the booster field rheostat 15 is operated by hand, or otherwise, to increase the field current, thereby raising the booster voltage and consequently raising the direct current line voltage to a predetermined value. Two actions have then taken place in the commutating field. The series commutating winding 9 has increased the field strength in proportion to the assumed increase of load current; in addition, the commutating shunt winding 12, which is connected in series with the booster field winding, has changed the field strength in proportion to the increase of booster voltage, that is, in proportion to the change in armature reaction of the converter.

In Fig. 2 are shown a no-load saturation curve and a curve showing variation of field current for increase of load at normal voltage taken on a booster of the type hereinbefore described as particularly adapted for the purposes intended. The characteristic of poor regulation is clearly brought out by the latter curve. The said two curves are deemed sufficient to disclose, at least approximately, to those skilled in the art the type of machine best adapted for embodiment in my invention.

In addition to providing a booster of the foregoing characteristics, the operation of my invention may be further aided by the employment of a rotary converter having inherent good commutating characteristics. As is understood by those well versed in the art, a dynamo-electric machine may be given said characteristics by the use of such refinements as a large air gap under the commutating poles, a chord winding, and in other ways.

Many variations may be made in the scheme hereinbefore described within the spirit and scope of my invention, and I desire that only such limitations shall be imposed as are indicated in the appended claims.

I claim as my invention:

1. The combination with a rotary converter provided with a cross field winding, of an alternating-current booster mechanically coupled thereto and in series relation therewith, said booster being provided with a main field winding, and means for maintaining an invariable ratio between the magnetomotive forces of said two field windings under all conditions of load.

2. The combination with a rotary converter provided with a cross field winding, of an alternating-current booster mechanically coupled thereto and in series relation therewith, said booster being provided with a main field winding, a common source for supplying exciting current to said two windings, and a current-adjusting device associated with said source and providing the sole means for adjusting the current therefrom.

3. The combination with a dynamo-electric machine adapted to deliver alternating and direct current and provided with main and commutating field windings, and a second dynamo-electric machine mechanically associated with said first machine and electrically connected in series therewith and provided with a field winding which is connected in series circuit with one of the commutating field windings of said first machine, of electrical means included in said series circuit which by its proper adjustment assists in maintaining a predetermined voltage and securing good commutating conditions on said first machine under all conditions of load.

4. The combination with a dynamo-electric machine adapted to deliver alternating and direct current and provided with commutating series field and main shunt field windings, and a second dynamo-electric machine mechanically associated with said first machine and electrically connected in series therewith of a circuit connected to a source of direct current and including a commutating field winding on said first machine and a main field winding on said second machine, and adjustable electrical means included in said circuit which by its proper adjustment assists in maintaining a predetermined voltage and securing good commutating conditions on said first machine under all conditions of load.

5. The combination with a dynamo-electric machine adapted to deliver alternating and direct current and provided with a main field winding, a series commutating field winding and an auxiliary commutating field winding, and a second dynamo-electric machine mechanically associated with said first machine and electrically connected in series therewith and provided with a field winding which is connected in series circuit with the auxiliary commutating field winding of said first machine, of an adjustable resistor also included in series circuit with said auxiliary commutating field winding which by its proper adjustment assists in maintaining a predetermined voltage and securing good commutating conditions on said first machine under all conditions of load.

6. The combination with a dynamo-electric machine adapted to deliver alternating and direct current, a field magnet frame therefor having a plurality of polar projections one portion of which is provided with a main field winding and another portion with an auxiliary commutating series field winding and with an auxiliary commutating field winding, and a second dynamo-electric machine mechanically associated with said first machine and electrically connected in series therewith and provided with a field winding which is connected in series circuit with said auxiliary commutating field winding of said first machine, of an adjustable resistor also included in series with said auxiliary commutating field winding which by its proper adjustment assists in maintaining a predetermined voltage and securing good commutating conditions on said first machine under all conditions of load.

7. The combination with a rotary converter, a field magnet frame therefor having a plurality of main polar projections, and commutating polar projections disposed intermediate thereto, the main projections being provided with a main field winding and the commutating projections being provided with a commutating series field winding and with an auxiliary commutating field winding, and a booster mechanically associated with said converter and electrically connected in series therewith and provided with a field winding which is connected in series circuit with the auxiliary commutating field winding of said converter, of an adjustable resistor also in series circuit with said auxiliary commutating field winding which by its proper adjustment assists in maintaining a predetermined voltage and securing good commutating conditions on said converter under all conditions of load.

8. The combination with a dynamo-electric machine adapted to deliver alternating and direct current and provided with a main field winding, a series commutating field winding, and an auxiliary commutating field winding, of a second dynamo-electric machine rigidly associated and electrically connected in series circuit relation therewith and provided with a main field winding which is connected in series circuit with the auxiliary commutating field winding of said first machine for assisting in securing good commutating conditions on the machine under all conditions of load.

9. The combination with a rotary converter provided with a main field winding, a series of commutating field winding and an auxiliary commutating field winding, of an alternating current booster rigidly associated and electrically connected in series therewith and provided with a main field winding which is connected in series circuit with the auxiliary commutating field winding of said converter for assisting in securing good commutating conditions on the converter under all conditions of load.

10. In a double-current dynamo-electric machine provided with a main field winding, a series commutating field winding and an auxiliary commutating field winding, of means for regulating the voltage embodying a second dynamo-electric machine mechanically associated with said first machine and electrically connected in series circuit relation therewith and provided with a main field winding, and means for assisting in securing good commutating conditions on said first machine, said means embodying an adjustable resistor connected in series circuit relation with the auxiliary commutating field winding of said first machine and the main field winding of said second machine.

11. In a rotary converter provided with a main field winding, a series commutating field winding and an auxiliary commutating field winding, of means for maintaining a predetermined voltage embodying an alternating current booster rigidly associated with said converter and electrically connected in series therewith and provided with a main field winding, and means for assisting in securing good commutating conditions on said converter, said means embodying an adjustable resistor connected in series circuit with the auxiliary commutating field winding of said converter and the main field winding of said booster.

12. The combination with a dynamo-electric machine having good inherent commutating characteristics and adapted to deliver alternating and direct current and provided with main and commutating field windings, and a second dynamo-electric machine having poor voltage regulation characteristics and mechanically associated with said first machine and electrically connected in series therewith and provided with a field winding which is connected in series circuit with one of the commutating field windings of said first machine, of electrical means included within said series circuit for assisting in maintaining a predetermined voltage and securing good commutation conditions on said first machine under all conditions of load.

13. The combination with a dynamo-electric machine having good inherent commutating characteristics, and adapted to deliver alternating and direct current and provided with a main field winding and with a plurality of commutating field windings, and a second dynamo-electric machine having poor voltage regulation characteristics and mechanically associated with said first machine and electrically connected in series therewith and provided with a main field winding which is connected in series circuit with one of the commutating field windings of said first machine, of adjustable electrical means included within said series circuit which by its proper adjustment assists in maintaining a predetermined voltage and securing good commutating conditions on said first machine under all conditions of load.

14. The combination with a rotary converter having good inherent commutating characteristics, a field magnet frame therefor having a plurality of main polar projections and intermediate commutating polar projections, the main projections being provided with a main field winding and the commutating projections being provided with commutating and field windings, and a booster having poor voltage regulation characteristics and mechanically associated with said converter and electrically connected in series therewith and provided with a field winding which is connected in series circuit with a commutating field winding of said converter, of an adjustable resistor included within said series circuit which by its proper adjustment assists in maintaining a predetermined voltage and securing good commutating conditions on said converter under all conditions of load.

15. The combination with a rotary converter, of an alternating current booster electrically and mechanically associated therewith, and means for compensating for variations in the armature reaction under the brushes of the converter occasioned by the booster.

16. The combination with a plurality of dynamo-electric machines mechanically coupled and electrically connected in series circuit relation, of means operatively associated with both machines for assisting in regulating the voltage and securing good commutating conditions on one of said machines.

17. The combination with a plurality of dynamo-electric machines mechanically coupled and electrically connected in series circuit relation, of means functioning electrically with both machines for assisting in regulating the voltage and securing good commutating conditions on one of said machines under all conditions of load.

18. The combination with a plurality of dynamo-electric machines mechanically coupled and electrically connected in series circuit relation and provided with exciting field windings, one of said machines being further provided with a commutating field winding, of an adjustable resistor common to the circuits of said commutating field winding and a field winding of the other machine for assisting in regulating the voltage and securing good commutating conditions on one of said machines under all conditions of load.

19. The combination with two dynamo-electric machines, one of which is provided with an exciting field winding and the other of which is provided with a commutating field winding, of joint means for simultaneously adjusting and simultaneously reversing the exciting field currents of said two field windings.

20. The combination with a rotary converter provided with a commutating winding, of an alternating current booster mechanically and electrically coupled thereto, whereby variations in the booster load alter the armature reaction of said rotary converter, and joint means for adjusting the load on said booster and the excitation of said commutating winding.

21. The combination with a dynamo-electric machine of the commutator type provided with means for producing a commutating field, of an auxiliary booster machine mechanically and electrically connected thereto, whereby variations in the load of said booster machine alter the armature reaction of said main machine, means for varying the load of said booster machine, and means associated therewith for simultaneously varying the strength of the commutating field of said main machine.

22. The combination with a dynamo-electric machine of the commutator type provided with means for producing a commutating field, of an auxiliary dynamo-electric machine so associated therewith that variations in the load of said auxiliary machine alter the armature reaction of said main machine, and joint means for adjusting the load on said auxiliary machine and the strength of said commutating field in the main machine.

23. The method of obtaining proper commutation in a dynamo-electric machine of the commutator, commutating-field type so associated with an auxiliary dynamo-electric machine that variations in the load of said auxiliary machine alter the armature reaction of said main machine which comprises jointly operating load adjusting apparatus of said auxiliary machine and commutating field exciting apparatus of said main machine.

In testimony whereof, I have hereunto subscribed my name this 21st day of March, 1913.

JOHN L. McK. YARDLEY.

Witnesses:
R. H. TABER,
B. B. HINES.